United States Patent [19]

Tanimizu

[11] Patent Number: 5,396,395
[45] Date of Patent: Mar. 7, 1995

[54] CONTROLLER FOR ELECTRIC POWER DISTRIBUTION APPARATUS

[75] Inventor: Toru Tanimizu, Hitachi, Japan

[73] Assignee: Hitachi, Ltd., Tokyo, Japan

[21] Appl. No.: 945,934

[22] Filed: Sep. 17, 1992

[30] Foreign Application Priority Data

Sep. 17, 1991 [JP] Japan .................. 3-235946

[51] Int. Cl.⁶ .............................................. H02J 3/04
[52] U.S. Cl. ...................................... 361/166; 361/72
[58] Field of Search .......................... 307/38, 39, 41; 361/166, 62, 189, 71, 190, 72, 191, 20, 192, 193

[56] References Cited

U.S. PATENT DOCUMENTS

| | | | |
|---|---|---|---|
| 3,413,486 | 11/1968 | Flieder et al. | 307/125 |
| 4,454,555 | 6/1984 | Delacy | 361/59 |
| 4,488,198 | 12/1984 | Christen et al. | 361/20 |
| 4,604,674 | 8/1986 | Hamel | 361/73 |
| 4,684,825 | 8/1987 | Sachs | 307/328 |
| 5,077,631 | 12/1991 | Cleary | 361/192 |
| 5,132,867 | 7/1992 | Klancher | 361/62 |
| 5,162,964 | 11/1992 | Higasa et al. | 361/20 |

FOREIGN PATENT DOCUMENTS 811223 4/1937 France .
793369 4/1958 United Kingdom .

Primary Examiner—A. D. Pellinen
Assistant Examiner—Fritz M. Fleming
Attorney, Agent, or Firm—Antonelli, Terry, Stout & Kraus

[57] ABSTRACT

Object of the present invention is to provide a controller for distribution apparatus which prevents extension of power failure.

In accordance with the controller for distribution apparatus related to the present invention, when a short circuit accident, for example, occurs in a control circuit for distribution apparatus, a breaker for distribution opens, an auxiliary coil becomes unexcited condition, and power failure is caused, but, an auxiliary contact point of the unexcited auxiliary coil closes in the other control circuit for distribution apparatus so as to excite a closing coil, and consequently, the other control circuit starts its operation immediately. Accordingly, extension of the power failure can be prevented and reliability of power supply can certainly be maintained.

6 Claims, 3 Drawing Sheets

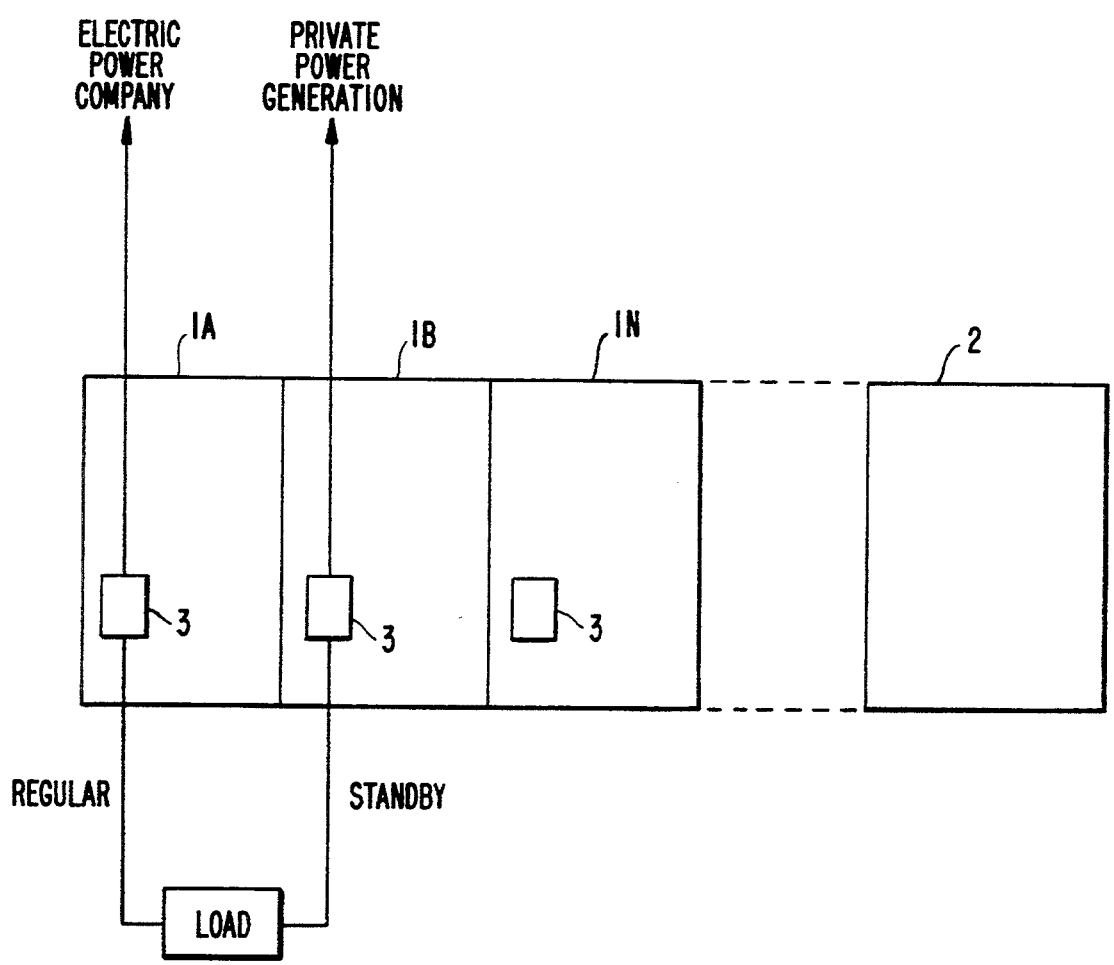

CONTROLLER FOR ELECTRIC POWER DISTRIBUTION APPARATUS

BACKGROUND OF THE INVENTION (1) Field of Industrial Utilization

The present invention relates to a controller for electric power distribution apparatus in which an interlock condition among lined apparatus is improved.

(2) Description of the Prior Art

Generally, electric power is supplied to loads from electric power companies. But, when a power failure is caused by an accident, such loads which are necessitated to prepare for a long time power outage as hospitals, computer power sources etc. switch over a power source from the electric power company to private power generation. A controller for electric power distribution apparatus having interlock conditions is used for the switching over the power source from electric power company to the private power generation.

The interlock condition is so settled that power supply from the private power generation is absolutely prohibited when power is being supplied from the electric power company. Reversely, power supply from the electric power company is absolutely prohibited when power is being supplied from the private power generation.

The controller used in the above described case is such an apparatus having control lines among a plurality of distribution apparatus and control distributing lines which are connected in parallel between the control lines of positive side and the control lines of negative side. The control distributing lines are arranged to each distribution apparatus. The control lines connect such interlock switches as operation switches and closing coils having the interlock conditions.

The interlock switch connects, for example, a contact point which operates the closing coil at the electric power company side to, for example, the control distributing line at the private power generation side, and also connects a contact point for the closing coil at the private power generation side to the control distributing line at the electric power company side. Accordingly, when the closing coil at the electric power company side is excited, the contact point of the closing coil at the private power generation side keeps opening, and electric current does not flow to the control distributing line. Such control circuit as above described is disclosed in, for example, JP-A-63-178737 (1988).

In accordance with the above described prior art, there is a disadvantage that power failure is caused when an accident is generated in the control distributing line at the electric power company side, because electric current does not flow to all of control distributing lines at both the electric power company side and the private power generation side. The above described disadvantage is typical of all closed type distributing apparatus, There is another disadvantage that all of the distribution apparatus cause power failure when some of the distribution apparatus are additionally installed because the control distributing lines are mutually wired in a plurality of distribution apparatus.

SUMMARY OF THE INVENTION (1) Objects of the Invention:

One of the objects of the present invention is to provide a controller for electric power distribution apparatus which maintains a reliability for power supply by preventing spread of power failure.

Other object of the present invention is to provide a controller for electric power distribution apparatus which is prevented from power failure when additional apparatus are installed.

(2) Measures to Solve the problems:

A controller for electric power distribution apparatus includes a control circuit for distribution apparatus having a breaker for distribution connected to a control bus bar, a closing control line and an auxiliary control line for connecting the controller, the distribution apparatus, the closing control line and the auxiliary control line being connected to the breaker for distribution, a closing coil for closing a second breaker which is connected to the closing control line, a closing contact point for exciting an auxiliary coil via the auxiliary control line by closing when the closing coil which is connected to the closing control line and the breaker for distribution is excited, and an auxiliary contact point which opens when the auxiliary coil is excited. A plurality of the control circuit for distribution apparatus are connected to the control bus bar. The auxiliary contact point, which opens when the auxiliary coil in one of the plurality of the control circuit for distribution apparatus is excited, is connected to the closing control line of another one of the plurality of the control circuit for distribution apparatus.

In accordance with the controller for electric power distribution apparatus relating to the present invention, when a short-circuit accident, for example, is generated in the control circuit for distribution apparatus, the breaker for distribution is opened, the auxiliary coil becomes unexcited, and power failure is caused, but, the auxiliary contact point of the unexcited state auxiliary coil in other control circuit for distribution apparatus closes and the closing coil is excited, and accordingly, the other control circuit for distribution apparatus is operated and power failure can be prevented. Furthermore, the auxiliary coil in other control circuit for distribution apparatus is excited and the auxiliary contact point in the other control circuit for distribution apparatus is kept open, and accordingly, even though an operator operates the closing coil in the control circuit for distribution apparatus by a mistake, the closing is impossible and safety can be maintained.

BRIEF DESCRIPTION OF THE DRAWINGS

FIG. 3 is a wiring diagram showing how a load can be connected to an electric power company and private power generation via an apparatus according to the present invention.

DETAILED DESCRIPTION OF THE EMBODIMENTS

Figure 1:
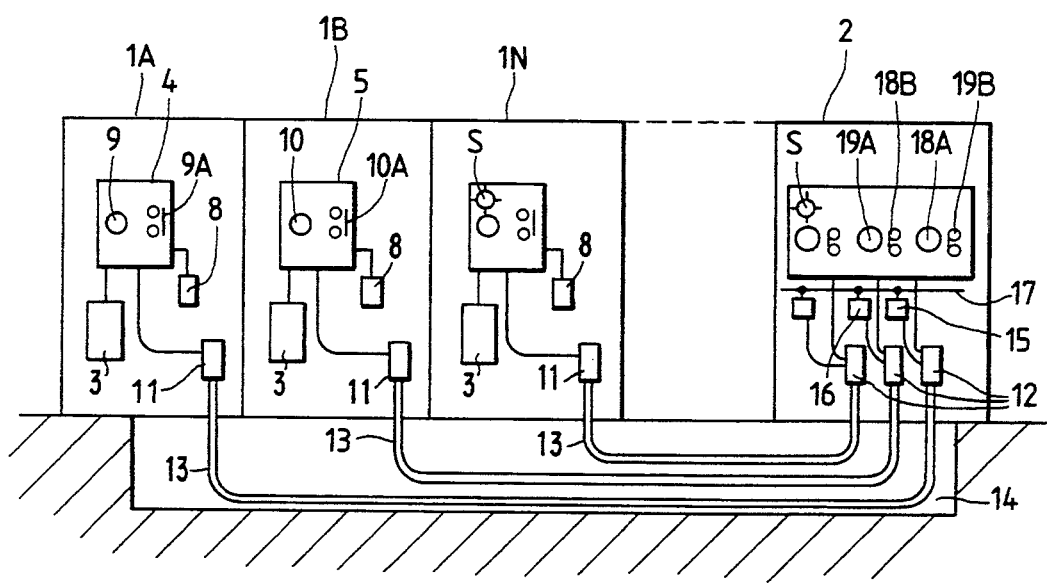
FIG. 1 is a front view of a controller for distribution apparatus illustrating an embodiment of the present invention.

Hereinafter, embodiments of the present invention are explained referring to FIGS. 1 and 2, which respectively illustrate a front view and a control circuit diagram of the controller for electric power distribution apparatus. A plurality of distribution apparatus 1A, 1B, ... 1N and the integrated controller 2 are arranged in a row. As each of the distribution apparatus has same structure, the explanation is performed taking the first and the second distribution apparatus 1A, 1B for examples.

The first and the second distribution apparatus 1A, 1B respectively have the disconnecting portion 3 inside. The first and the second breakers 4, 5 electrically close or open the disconnecting portion 3 by entering or coming out from inside of the distribution apparatus 1A, 1B. The first and the second distribution apparatus 1A, 1B, and the first and second breakers 4, 5, are provided with the closing control line 6 and the auxiliary control line 7 for a control circuit.

The closing control line 6 of the distribution apparatus 1A, 1B, connects the operation switch 8, and the closing coils 9, 10. By operating the operation switch 8 to excite the closing coils 9, 10, each of breakers 4, 5, is connected or disconnected. The closing contact points 9A, 10A, which are closed by excitation of the closing coils 9, 10, are connected to the auxiliary control line 7. And, the disconnecting portion is provided to both the control lines 6, 7.

Terminals of the closing control line 6 and the auxiliary control line 7 at the distribution apparatus side are connected to a plurality of the connectors 12 in the integrated controller 2 through the tie cables 13 which are connected to each of the connectors 11 at the distribution apparatus side. A plurality of the tie cables 13 are arranged in the underground cable pit 14 which is formed under floors of each distribution apparatus 1A, 1B, . . . 1N and the integrated controller 2.

The direct current control bus bar 17 and the control lines 6, 7, are connected to primary side and secondary side of the first and the second breakers 15, 16, for distribution in the integrated controller. The auxiliary coils 18A, 19A and the auxiliary contacting points 18B, 19B are connected to the auxiliary control line 7 and the closing control line 6 between the breakers 15, 16, for distribution and the connector 12. The auxiliary coils 18A, 19A are excited by closing of the closing contact points 9A, 10A. The auxiliary contact points 18B, 18B become open by excitation of the auxiliary coils 18A, 19A.

The distribution apparatus 1A, 1B having the closing control line 6 and the auxiliary control line 7 from the breakers 15, 16 for distribution to the closing coils 9, 10 and the integrated controller 2 are generically called the first and the second (regular and standby) control circuits for distribution apparatus 100A, 100B. Each of the control circuits for distribution apparatus 100A, 100B, is connected to the primary side direct current control bus bar 17 of the first and the second breakers 15, 16, for distribution, and is electrically independent each other. The auxiliary contact point 18B which becomes open by exciting of the auxiliary coil 18A of the one control circuit for distribution apparatus 100A is connected to the closing control line 6 of the other control circuit for distribution apparatus 100B. Furthermore, the auxiliary contact point 19B which becomes open by exciting of the auxiliary coil 19A of the one control circuit for distribution apparatus 100B is connected to the closing control line 6 of the other control circuit for distribution apparatus 100A.

In the present embodiment, two of the control circuits for distribution apparatus 100 are installed, but more than two control circuits are also usable. And, as for the integrated control apparatus, a plurality of independent control apparatus or control portions are usable.

Figure 2:
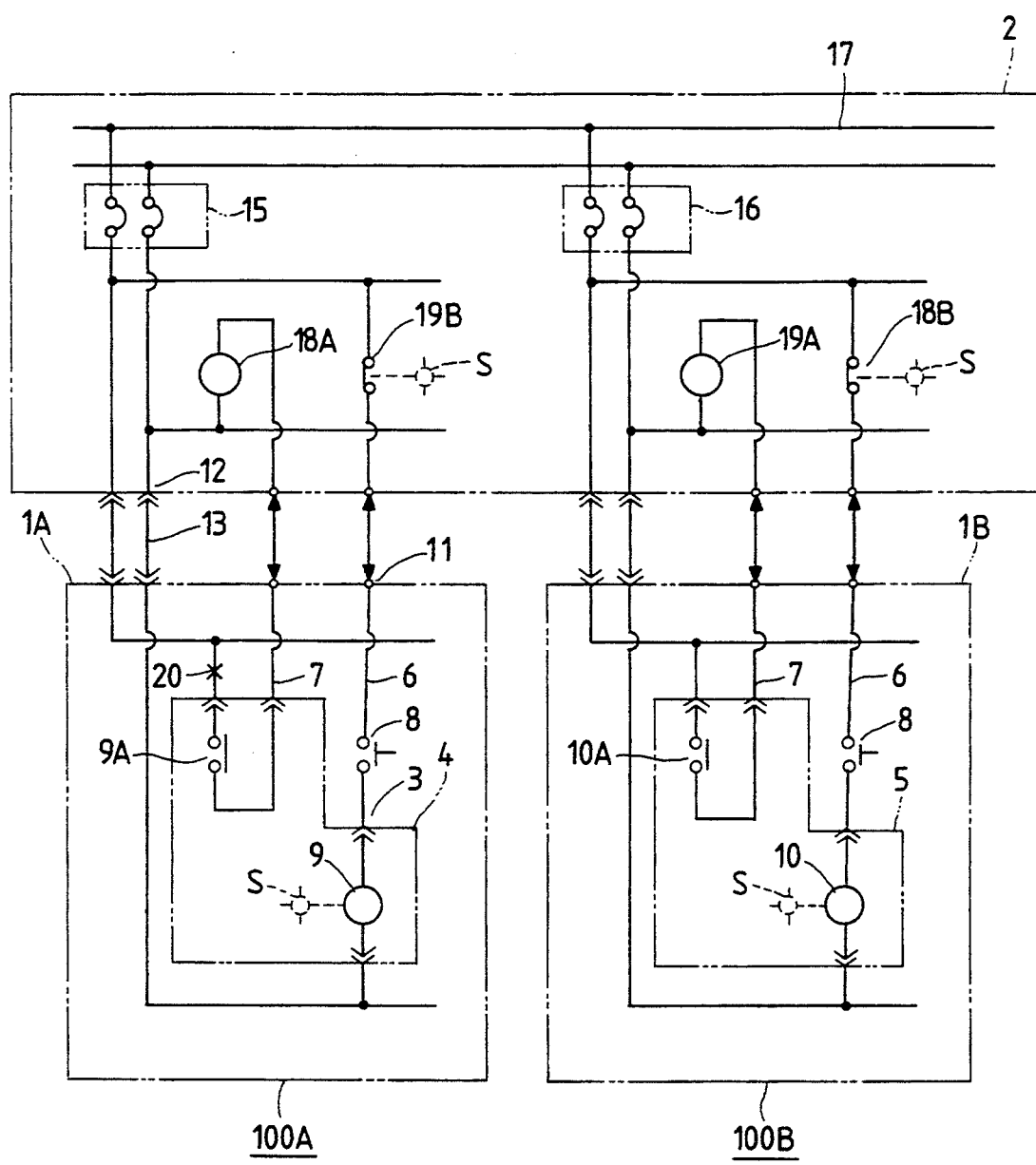
FIG. 2 is a wiring diagram indicating wiring of the control circuit for the distribution apparatus in FIG. 1.

Next, referring to FIG. 2 illustrating control circuits, operation of the first and the second control circuits for distribution apparatus 100A, 100B is explained.

In a case of the first breaker 4 closing, the first closing coil 9 is excited by closing the operation switch 8, and the first closing contact point 9A is closed and the first auxiliary coil 18A is excited, while, the first auxiliary contact point 18B is installed at side of the second control circuit for distribution apparatus, and operates reversely to the first auxiliary coil 18A and is open. But, the second auxiliary contact point 19B is closed because the second auxiliary coil 19A is not excited. Accordingly, the first breaker 4 is in a closing condition and the second breaker 5 is in an open condition. Owing to the above described condition, the operation switch 8 of the control circuit side of the second distribution apparatus 100B can not be operated even if the operator erroneously try to operate it, and an interlock condition is established. In accordance with the present invention, safety of operation is surely maintained as above described by such a simple structure that only the first auxiliary contact point 18B and the second auxiliary contact point 19B are interchanged.

When a short circuit accident occurs at the portion 20 marked X of the auxiliary control line 7 in the first distribution apparatus 1A under the above described condition and the breaker for the first distributing apparatus 15 opens, the first closing coil 9 becomes an unexcited condition, the first breaker 4 opens, and the control circuit side for the first distribution apparatus causes power failure. At that time, the first auxiliary coil 18A is in an unexcited condition, the first auxiliary contact point 18B is closed such that the second closing coil 10 can be excited by closing the operation switch 8, and the control circuit for the second distribution apparatus 100B is operable, and accordingly, extension of the power failure caused by the accident can be prevented.

The above described feature of the present invention causes such an advantage that additional installation of the first breaker 4 can be performed with simultaneous operation of the second breaker 5 when the first breaker 4 is additionally installed at an adjacent place to the second breaker 5.

Besides, an arrangement of the tie cable 13 which connects each distribution apparatus 1A, . . . 1N, and the integrated controller 2 through the connectors 11, 12, at underground cable pit causes such an advantage that extension of fire can be prevented when a fire occurs, for example, in the first distribution apparatus 1A. Although each distribution apparatus is separated from the adjacent distribution apparatus with steel plates and fire extension is scarcely anticipated, there is a possibility to extend the fire to the adjacent distribution apparatus and the integrated controller through the tie cable 13. But, the fire extension can be prevented by arrangement of the tie cable 13 at underground cable pit because the tie cable 13 becomes less susceptible to burning.

Furthermore, hitherto a great deal of working time and workers have been required for a performance testing between each distribution apparatus 1A, . . . 1N, and the integrated controller 2 when the tie cables 13 were not used, because the performance testing was carried out once in the factory using temporary wiring between the each distribution apparatus and the integrated controller, and, after the apparatuses were installed at each designated location in a predetermined place, for example, a transforming station of a building, the performance testing was again carried out by the installing workers using temporary wiring between the distribution apparatus and the integrated controller.

But, in accordance with the present invention, working time and workers necessary for the wiring can be remarkably reduced, because connection between the each distribution apparatus 1A, . . . 1N, and the integrated control apparatus 2 has been facilitated by using the tie cable 13 through the connectors 11, 12. Farther, in accordance with the present invention, a display lamp S in the front panel is lit on so as to prevent an erroneous operation of workers when the closing contact points 9A, 10A, and the auxiliary contact points 18B, 19B, are closed.

As for the other embodiment of the present invention, the above described effect can be realized by providing control circuits for distribution apparatus having the first auxiliary coil to a plurality of distribution apparatus themselves and providing the first auxiliary contact point which closes when the first auxiliary coil is in an unexcited condition to the adjacent distribution apparatus. Furthermore, as shown in FIG. 3, the control circuit for distributing apparatus can be provided to the electric company side supply system and private generation system of the net work receiving facility.

What is claimed is;

1. A controller for electric power distribution apparatus comprising:
   a control circuit for distribution apparatus having a breaker for distribution connected to a control bus bar;
   a closing control line and an auxiliary control line for connecting said controller and said distribution apparatus, said closing control line and said auxiliary control line being connected to said breaker for distribution;
   a closing coil for closing a second breaker which is connected to said closing control line;
   a closing contact point for exciting an auxiliary coil via said auxiliary control line by closing when the closing coil which is connected to said closing control line and said breaker for distribution is excited; and
   an auxiliary contact point which opens when said auxiliary coil is excited;
   wherein a plurality of said control circuit for distribution apparatus are connected to said control bus bar; and
   wherein the auxiliary contact point which opens when the auxiliary coil in one of said plurality of said control circuit for distribution apparatus is excited is connected to the closing control line of another one of said plurality of said control circuit for distribution apparatus.

2. A controller for electric power distribution apparatus as claimed in claim 1, wherein said control circuit for distribution apparatus is installed at each of a plurality of distribution apparatus.

3. A controller for electric power distribution apparatus as claimed in claim 1, wherein a display lamp which is lit on when said closing coil or the auxiliary contact point is closed is installed at a front panel of the distribution apparatus or of the controller.

4. A controller for electric power distribution apparatus as claimed in claim 1, wherein said control circuit for distribution apparatus is installed between a distribution route of an electric power company side and a private power generation route in a network power receiving facility.

5. A controller for electric power distribution apparatus as claimed in claim 1, further comprising:
   a first connector at the controller which is furnished with said closing control line and said auxiliary control line connected to the breaker for distribution, the auxiliary coil, and the auxiliary contact point;
   a second connector at the distribution apparatus which is furnished with said closing coil and the closing contact point; and
   a tie cable connected to said first connector and said second connector.

6. A controller for electric power distribution apparatus as claimed in claim 1, further comprising:
   a first connector at the controller which is furnished with said closing control line and said auxiliary control line connected to the breaker for distribution, the auxiliary coil, and the auxiliary contact point;
   a second connector at the distribution apparatus which is furnished with said closing coil and the closing contact point; and
   a tie cable connected to said first connector and said second connector;
   wherein said tie cable is arranged in a cable pit furnished under the distribution apparatus and the controller.

* * * * *